April 24, 1945.     R. A. GOEPFRICH     2,374,536
BRAKE
Original Filed March 22, 1941     3 Sheets-Sheet 1
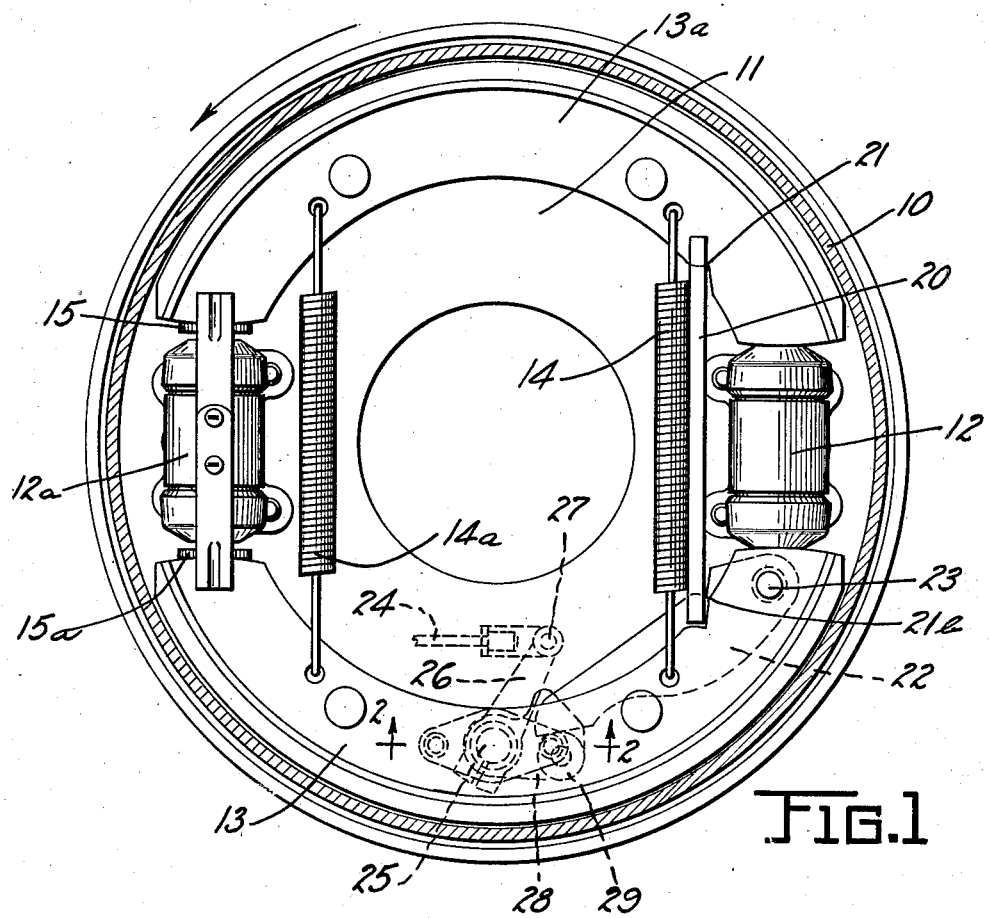
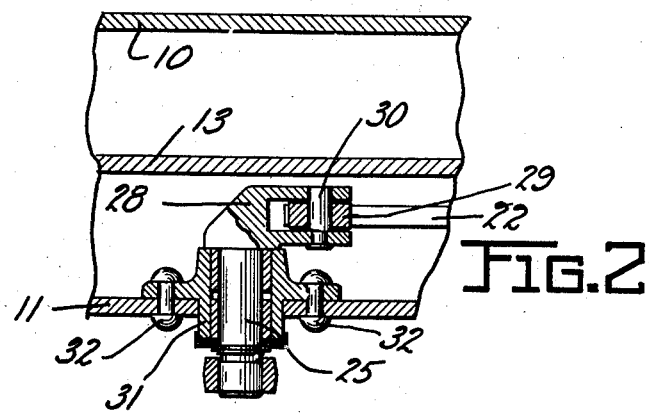
INVENTOR
RUDOLPH A. GOEPFRICH
BY
M. W. McConkey
ATTORNEY April 24, 1945.    R. A. GOEPFRICH    2,374,536
BRAKE
Original Filed March 22, 1941    3 Sheets-Sheet 2

INVENTOR
RUDOLPH A. GOEPFRICH
BY
M. W. McConkey
ATTORNEY

INVENTOR
RUDOLPH A. GOEPFRICH
BY
ATTORNEY

Patented Apr. 24, 1945

2,374,536

UNITED STATES PATENT OFFICE 2,374,536

BRAKE

Rudolph A. Goepfrich, South Bend, Ind., assignor to Bendix Aviation Corporation, South Bend, Ind., a corporation of Delaware Substituted for abandoned application Serial No. 384,634, March 22, 1941. This application November 1, 1941, Serial No. 417,547

10 Claims. (Cl. 188—106)

This application relates to brakes and more particularly to those portions of brakes which are associated with the wheels of the vehicle to be braked.

This application is a substitute for applicant's abandoned application Serial No. 384,634, filed March 22, 1941.

It is applicant's object to provide a parking or auxiliary brake operating mechanism which can be satisfactorily combined with a service brake operating mechanism and a brake having a pair of individually shiftable shoes. It has been discovered that a brake having an advantageous combination of braking effectiveness and smoothness in operation can be formed by using brake shoes which are free to anchor at either end according to the direction of rotation of the brake drum. To combine with a main or service brake operating mechanism having shiftable shoes an auxiliary or parking brake which separately applies the shoes while allowing them to anchor at either end is the chief purpose of applicant's invention.

Other desirable objects and features will be apparent during the following description, in the course of which reference will be had to the accompanying drawings, in which:

Figure 1 is a section taken through a brake drum on a plane just inside the head of the drum, showing the brake shoes and applying means therefor in elevation;

Figure 2 is a section taken on the line 2—2 of Figure 1;

Figure 3:
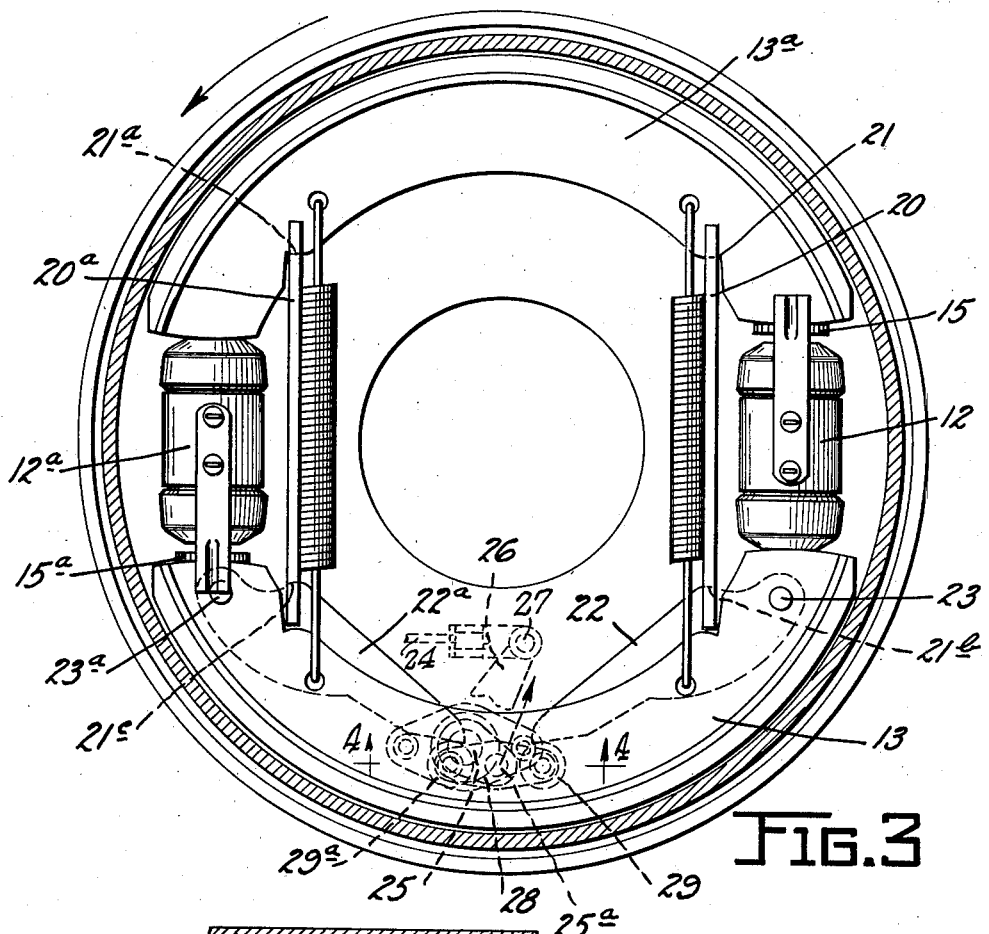
Figure 3 is a view showing a modification of the brake of Figure 1.

Referring to Figures 1 and 2, the brake shown therein is of the type having a pair of shoes which are individually shiftable to anchor at one end or the other according to the direction of rotation of the brake drum at the time the shoes are moved thereagainst. The brake shown comprises a rotatable brake drum 10, a non-rotatable support member or backing plate 11, a pair of hydraulic slave cylinders 12 and 12a mounted on the backing plate, a pair of brake shoes 13 and 13a mounted between the hydraulic cylinders, springs 14 and 14a for normally holding the brake shoes in released position, and means apart from the hydraulic cylinders and of a mechanical nature for applying the shoes to the drum independently of the hydraulic cylinders. It will be understood that pistons in the hydraulic cylinders are adapted to urge the shoes outwardly to impede the rotation of the drum. The wrapping action exerted by the drum on the shoes causes the shoes, which are freely floating, to each anchor on one of the cylinders depending on the direction of rotation of the drum. When the drum is rotating in a forward direction, as indicated by the arrow, shoe 13 anchors on hydraulic cylinder 12 and shoe 13a anchors through an adjusting member 15 on cylinder 12a. When the drum is rotating in a rearward direction, shoe 13 anchors through an adjusting member 15a on cylinder 12a and shoe 13a anchors on shoe 12.

The brake applying mechanism thus far described constitutes that part of the brake normally termed the main or service brake operating mechanism. In addition to the service brake operating mechanism it is customary to provide a parking or auxiliary brake operating mechanism. In this instance the auxiliary brake operating mechanism comprises a strut 20 which contacts the web of shoe 13a at 21 (the strut being forked to receive the shoe web), a lever 22 pivoted by a pin 23 or other suitable means to the shoes 13 and contacting at 21b the other end of the strut 20 (the strut being forked to receive the lever), and means for swinging the lever in a clockwise direction about its pivot pin 23 to spread the ends of the shoes adjacent the cylinder 12. The swinging means comprises a cable 24 and a shaft 25 having an arm 26 connected at 27 to the cable and a second arm 28 which is forked to receive a roller 29 rotatable about a pin 30 extending through the forks of the arm 28. The shaft 25 extends through the backing plate and is journalled in a bearing member 31 which has ears extending on either side, the said ears being secured by bolts 32 or other suitable means to the backing plate 11. The roller 29 contacts the end of lever 22. Pulling of the cable 24 by the operator of the vehicle through suitable mechanical connections causes the arm 26 (Figure 1) to swing in a counter-clockwise direction turning the shaft 25 and consequently swinging the roller-carrying arm 28 in a counter-clockwise direction. The roller pushes against the lever 22 moving it in a clockwise direction about its pivot 23 to spread the brake shoes. It will be noted that only one of the shoes will be forced by the wrapping action of the drum against its anchor. In forward rotation the action of the shoe 13a will be self-energizing, i. e., the applying force will be built up by the wrapping effect of the drum. In rearward rotation, shoe 13 will be self-energizing.

Figure 4:
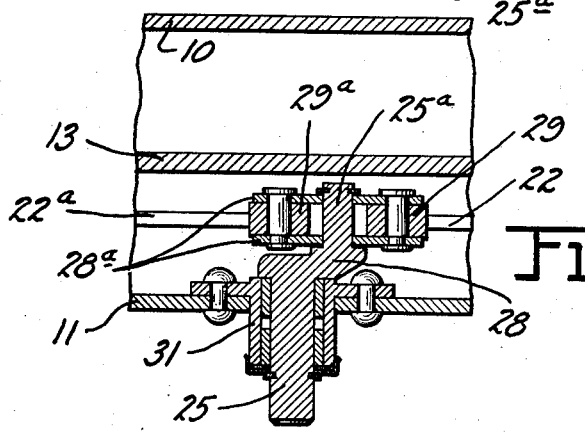
Figure 4 is a section taken on the line 4—4 of Figure 3.

The brake assembly of Figures 3 and 4 has both service and auxiliary brake operating mechanisms in which both shoes are self-energizing during either direction of drum rotation. The service brake applying means of Figure 3 is very similar to that of Figure 1 except that, in Figure 3, each hydraulic cylinder has an adjusting member associated with it.

The auxiliary or parking brake operating mechanism of Figure 3 has a pair of struts 20 and 20a which contact the shoe 13a at points 21 and 21a near the ends of the said shoe. The struts extend across the brake in lines substantially parallel to the axes of the hydraulic cylinders 12 and 12a and they (the struts) are contacted adjacent the ends of the shoe 13 by a pair of levers 22 and 22a. The levers are substantially identical in form and are respectively pivoted at 23 and 23a on the web of the shoe 13. A shaft 25 has an arm 26 connected to a cable 24 at a point on the other side of the backing plate from the brake shoes. The shaft 25 extends through the backing plate and is journalled in a bearing member 31, the said bearing member being secured to the backing plate. It will be noted that the bearing member 31 is not opposite the center of shoe 13 but is in a position a little to one side of center. Inside the backing plate and adjacent the shoe 13, an arm 28 extends from the shaft 25. The arm 28 has a shaft 25a extending therefrom, the shaft having an axis parallel to, but laterally spaced from, the axis of the shaft 25. Arranged to swing freely about the shaft 25a is an equalizer 28a. The equalizer is forked on both sides of the shaft 25a to carry a pair of rollers 29 and 29a.

The operation of this improved auxiliary or parking brake operating mechanism of Figure 3 is as follows: (Incidentally, it will be appreciated that the "auxiliary" brake operating mechanism might be used as a service brake operating mechanism, if desired.) Actuation of the cable 24 causes the arm 26 to swing in a counter-clockwise direction, turning the shaft 25. Turning of the shaft 25 causes the arm 28 to swing about 25 in a counter-clockwise direction (Figure 3), with the result that the shaft 25a is moved upwardly, as indicated by the arrow in Figure 3. This movement of the shaft exerts a force tending to move the equalizer bodily upward so that the rollers 29 and 29a exert a force on the levers 22 and 22a respectively, tending to move the levers about their respective pivot points 23 and 23a. The lever 22 exerts a force through link or strut 20 on the right end of shoe 13a moving the shoe against the brake drum. At the same time, owing to the resistance against movement of the shoe 13a, the strut 20 exerts a force against the lever 22 causing the lever to pivot on the strut at 21b and move the pin 23 outward carrying the right end of shoe 13 against the drum. Simultaneously the lever 22a swings about its pivot 23a pushing on the strut 20a to move the left end of shoe 13a against the brake drum. The reaction against the lever 22a causes the lever to pivot at 21c against the strut 20a and force the pin 23a outwardly moving the left end of shoe 13 against the drum. Since both ends of both shoes are moved against the brake drum, the shoes will anchor according to the direction of rotation of the drum as they do when applied by the hydraulic cylinders. Both shoes are, therefore, self-energizing in either direction of drum rotation and this is true whether they are applied hydraulically or mechanically.

Figure 5:
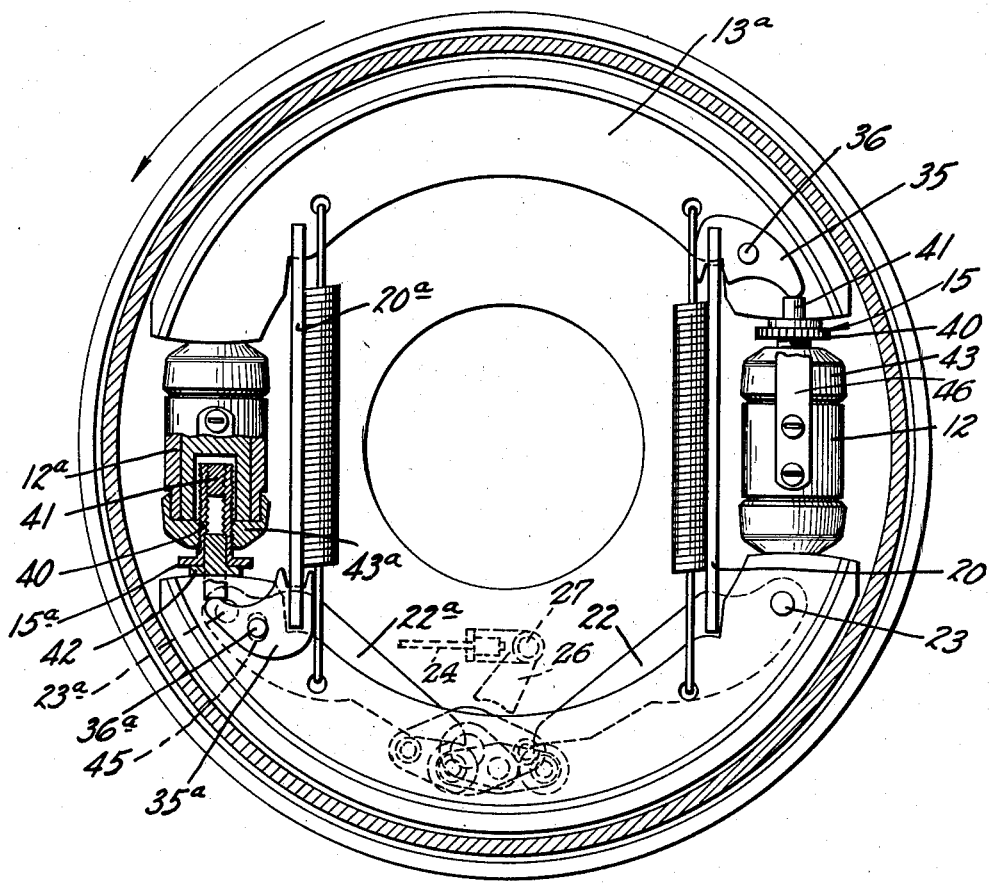
Figure 5 is a view showing a modification of the brakes of Figures 1 and 3.

The modification shown in Figure 5 includes mechanism for automatically adjusting the auxiliary or mechanical brake operating mechanism concurrently with adjustments of the service or hydraulic brake operating mechanism. In most respects, the brake of Figure 5 is the same as that of Figure 3. Figure 3 shows means 15 and 15a for adjusting the position of the shoes relative to their anchors (i. e. the hydraulic cylinders) whenever wear of the shoe lining makes such adjustment necessary. But Figure 3 does not have any means inside the brake drum for adjusting the auxiliary or mechanical brake operating mechanism concurrently with adjustment of the position of the shoes relative to the drum. Obviously, an adjustment can be accomplished in the brake of Figure 3 by shortening the cable so as to take up play in the mechanical connections.

Figure 6:
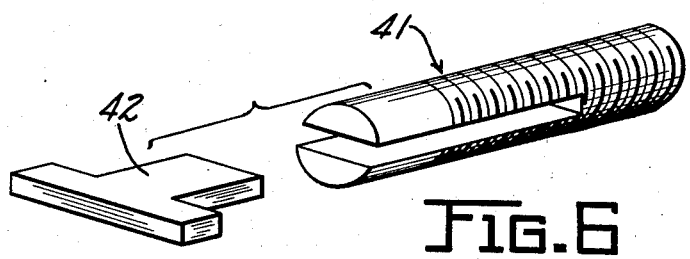
Figure 6 shows in perspective certain exploded parts of the brake of Figure 5.

In the brake of Figure 5 the mechanical or auxiliary brake operating mechanism is adjusted simultaneously with the hydraulic or service brake operating mechanism. The strut 20 extends between the lever 22 and a small lever 35 which is pivoted at 36 on the shoe 13a, while the strut 20a extends between the left end of shoe 13a and a small lever 35a which is pivoted at 36a on the lever 22a. Adjusting devices for positioning the shoes to compensate for wear are indicated generally at 15 and 15a. The two adjusting devices are identical and are associated respectively with the cylinders 12 and 12a. Each of the devices 15 and 15a comprises a ratchet screw member 40, a slotted screw 41 and a T-shaped thrust member 42 (see Figure 6). Each ratchet member 40 has an externally threaded body adapted to be screwed into a cylinder cap 43 or 43a and the head of each ratchet member has a series of teeth on its periphery which may be normally engaged by a pawl carried by a member 46 which is attached to cylinder 12 to prevent unwanted rotation of the ratchet. Each of the ratchet members is hollow, having a longitudinal internally threaded opening into which may be screwed one of the externally threaded slotted screws 41. The internal and external threads of the ratchet member are of opposite hand, i. e., one has a right hand thread while the other has a left hand thread. The pitch of the threads on the inside of the ratchet members is the same as the pitch of the threads on the outside of the ratchet members. This relationship is necessary because the levers 35 and 35a each have a 1:1 ratio, i. e., the power arm of the lever is equal in length to the load arm of the lever. Because of this it is necessary that the member 41 during adjustment move outwardly with respect to the stationary cylinder twice as fast as the member 42, and this is accomplished by having equal pitch threads on either side of the ratchet member. Each T-shaped thrust member 42 is inserted into the slot in its corresponding slotted screw 41 so that the stem of the T is inside the opening in the corresponding ratchet member while the head of the T rests between the head of the ratchet member and the web of the adjacent shoe. The outer ends of the slotted screws 41 extend a short distance beyond the ends of the adjacent shoe webs and embrace the said webs. At their outer ends the screws 41 are contacted by the ends of the small levers 35 and 35a.

When wear of the shoe lining necessitates an adjustment, the ratchet members are rotated to force them outwardly from their respective cylinders. The ratchet heads, pushing through the heads of the T-shaped members move the shoes toward the drum. At the same time the slotted screws are prevented by the shoe webs from rotating with the ratchet members. Owing to the difference in hand of inner and outer threads the slotted screws move outwardly with twice the speed of the ratchet members. Thus the levers 35 and 35a are swung about their pivots 36 and 36a to compensate for slack in the mechanical or auxiliary brake linkage caused by adjustment of the positions of the shoes relative to the hydraulic cylinders.

In operation, when the large lever 22 is moved to apply the brake, the strut 20 pushes against the small lever 35 which pivots against the adjacent slotted screw 41 to force its pivot 36 and the right end of shoe 13a outwardly against the drum. Through the pivot 23 the right end of shoe 13 is moved toward the drum. Simultaneously, as the right end of large lever 22a is swung in a counter-clockwise direction by the equalizer it pivots about 23a and moves the pivot 36a upwardly causing the small lever 35a to pivot on the adjacent slotted screw 41 of the adjusting member 15a and push the strut 20a upwardly to move the left end of shoe 13a against the drum. A slot 45 is provided in the web of shoe 13 to accommodate the movements of the pivot 36a. At the same time resistance of the strut transmitted through pivot pin 36a causes the lever 22a to pivot about pin 36a moving the pin 23a downwardly and applying the left end of shoe 13 to the brake drum.

It will be appreciated that my invention will be capable of numerous modifications and uses without departing from the scope thereof. It is consequently my desire not to be limited except by the terms of the appended claims.

I claim:

1. In a brake comprising a brake drum, a pair of individually shiftable brake shoes, and anchors for the shoes, the combination of means for adjusting the position of the shoes relative to the drum to compensate for shoe wear, with means for applying the shoes to the drum comprising a pair of levers pivoted on opposite ends of one of the shoes and connections between each of the levers and one end of the other shoe, the connections in each case including a strut and an auxiliary lever contacting one end of the strut, each auxiliary lever being positioned by the shoe adjusting means.

2. In a brake comprising a brake drum, a pair of individually shiftable brake shoes, and anchors for the shoes, the combination of means for adjusting the position of the shoes relative to the drum to compensate for shoe wear, with means for applying the shoes to the drum comprising a pair of levers pivoted on opposite ends of one of the shoes and connections between each of the levers and one end of the other shoe, the connections in each case including a strut and an auxiliary lever contacting one end of the strut, each auxiliary lever having one end thereof movable according to actuation of the shoe adjusting means.

3. In a brake in combination, a brake drum, a pair of brake shoes individually shiftable to anchor according to the direction of drum rotation, anchors for the shoes, a pair of adjusting devices associated with the anchors for adjusting the position of the shoes relative to the drum to compensate for shoe wear, a first and second lever pivoted on one of the shoes adjacent opposite ends thereof, a third lever connected to the first lever and having one end adapted to pivot on one of the adjusting devices, a strut connecting the other end of the third lever to the other shoe at a point adjacent one end of the shoe, a fourth lever pivoted to the latter shoe adjacent the other end of the shoe and having one end adapted to pivot on the second adjusting device, a strut connecting the other end of the said fourth lever to the second lever, and means for simultaneously moving the first and second levers about their pivots to force both ends of both shoes against the brake drum.

4. In a brake in combination, a brake drum, a pair of brake shoes individually shiftable to anchor according to the direction of drum rotation, anchors for the shoes, a pair of adjusting devices associated with the anchors for adjusting the position of the shoes relative to the drum to compensate for shoe wear, a first and second lever pivoted on one of the shoes adjacent opposite ends thereof, a third lever pivoted to the first lever and having one end adapted to pivot on one of the adjusting devices, a strut pivoted to the other end of the third lever and pivoted to the other shoe at a point adjacent one end of the shoe, a fourth lever pivoted to the latter shoe adjacent the other end of the shoe and having one end adapted to pivot on the second adjusting device, a strut pivoted to the other end of the said fourth lever and pivoted to the second lever, and an equalizer for simultaneously and with equal force moving the first and second levers about their pivots to force both ends of both shoes against the brake drum.

5. In a brake having a brake drum, a pair of individually shiftable brake shoes, service brake operating means comprising a pair of hydraulic applying cylinders, and auxiliary brake operating means comprising mechanical linkage for simultaneously spreading both ends of both shoes, the combination of means for adjusting the positions of the brake shoes to compensate for wear, with means controlled by operation of the aforesaid means for automatically taking up any slack in the mechanical linkage occasioned by the shoe adjustment.

6. In a brake having a brake drum, a pair of individually shiftable brake shoes, a pair of anchors between the ends of the shoes for receiving the braking torque of one or the other of the shoes depending on the direction of drum rotation, a primary means for spreading the ends of the shoes against the drum, and a secondary means for spreading the shoe ends against the drum comprising mechanical linkage, mechanism associated with each shoe for simultaneously adjusting the position of the respective shoe to compensate for shoe wear and taking up any slack in the mechanical linkage occasioned by the shoe adjustment, comprising a first member movable relative to the respective anchor to increase the spacing of the respective shoe from the anchor, and a second member automatically caused by such movement of the first member to move relative to said first member, said second member being operatively associated with the mechanical linkage in such a way that movement thereof takes up slack in the mechanical linkage.

7. In a brake having a brake drum, a pair of individually shiftable brake shoes, a pair of anchors between the ends of the shoes for receiving the braking torque of one or the other of the shoes depending on the direction of drum rotation, a primary means for spreading the ends of the shoes against the drum, and a secondary means for spreading the shoe ends against the drum comprising mechanical linkage, mechanism provided for each shoe for adjusting the position of the respective shoe to compensate for shoe wear and for simultaneously taking up slack in the mechanical linkage occasioned by the shoe adjustment, comprising a hollow screw member having internal and external threads of opposite hand, said member being screwed into the respective anchor and being operatively associated with the end of the respective shoe whereby rotation of said member in a certain direction increases the spacing of the end of the shoe from the anchor, and a second screw extending into the threaded interior of said hollow screw member and operatively associated with the mechanical shoe spreading linkage, whereby rotation of said hollow screw member automatically causes said second screw to move relative to the hollow screw member to take up any slack in the mechanical linkage occasioned by increasing the spacing of the shoe end from the anchor.

8. In a brake having a pair of shoes which are individually shiftable to anchor at either end, and linkage for simultaneously transmitting brake applying force to both ends of both shoes, said linkage including a pair of levers pivoted at the opposite ends of one shoe and a pair of struts extending from the levers toward the respective ends of the other shoe, the combination of means for adjusting the positions of the shoes to compensate for shoe wear, with means for automatically and simultaneously taking up slack in the linkage whenever the shoe positions are adjusted.

9. In a brake having a brake drum, a pair of brake shoes which are individually shiftable to anchor at either end according to the direction of drum rotation, and anchors for the shoes, mechanism for applying and adjusting the brake comprising a pair of adjusting devices associated with the anchors, each having a first member for adjusting the position of the respective shoe relative to the drum to compensate for shoe wear and a second member movable relative to the first member and automatically moved by said first member, a first and second lever pivoted on one of the shoes adjacent opposite ends thereof, a third lever connected to the first lever and having one end adapted to pivot on the second member of one of the adjusting devices, a strut connecting the other end of the third lever to the other shoe at a point adjacent one end of the shoe, a fourth lever pivoted to the latter shoe adjacent the other end of the shoe and having one end adapted to pivot on the second member of the other of the adjusting devices, a strut connecting the other end of the said fourth lever to the second lever, and means for simultaneously moving the first and second levers about their pivots to force both ends of both shoes against the brake drum.

10. In a brake having a brake drum, a pair of brake shoes which are individually shiftable to anchor at either end according to the direction of drum rotation, and a pair of hydraulic cylinders serving as actuators and anchors for the shoes, adjusting means and auxiliary applying means for the brake comprising a pair of adjusting devices associated with the hydraulic cylinders, each of said adjusting devices comprising a member having a stem provided with interior and exterior threads of opposite hand and screwed into a portion of the respective hydraulic cylinder and a screw engaged with the threaded interior of said stem and automatically moved longitudinally of said stem whenever said member is rotated, a first and second lever pivoted on one of the shoes adjacent opposite ends thereof, a third lever connected to the first lever and having one end pivoted on the aforesaid screw of one of the adjusting devices, a strut connecting the other end of the third lever to the other shoe at a point adjacent one end of the shoe, a fourth lever pivoted to the latter shoe adjacent the other end of the shoe and having one end pivoted on the aforesaid screw of the other of the adjusting devices, a strut connecting the other end of said fourth lever to the second lever, and means for simultaneously moving the first and second levers about their pivots to force both ends of both shoes against the brake drum.

RUDOLPH A. GOEPFRICH.